United States Patent [19]

Bucks et al.

[11] Patent Number: 5,722,143
[45] Date of Patent: Mar. 3, 1998

[54] SPINDLE CARRIER AND HOLDER

[75] Inventors: Brent L. Bucks, Valparaiso, Ind.; Graham R. Calvert, Leicestershire, England; Paul E. Arrasmith, Valparaiso, Ind.

[73] Assignee: Urschel Laboratories Incorporated, Valparaiso, Ind.

[21] Appl. No.: 630,762

[22] Filed: Apr. 10, 1996

[51] Int. Cl.[6] ............................................. B23Q 3/00
[52] U.S. Cl. ...................... 29/281.5; 29/283; 269/37; 269/909
[58] Field of Search ........................... 269/249, 37, 45, 269/3, 239, 909; 29/281.5, 283

[56] References Cited

U.S. PATENT DOCUMENTS

| 1,352,647 | 9/1920 | Benton | 269/249 |
|---|---|---|---|
| 4,674,168 | 6/1987 | Bittner . | |
| 5,129,299 | 7/1992 | Fischer et al. . | |
| 5,265,854 | 11/1993 | Whiteford | 269/3 |
| 5,313,864 | 5/1994 | Forgash et al. . | |
| 5,335,407 | 8/1994 | Verkerk | 29/283 |
| 5,379,519 | 1/1995 | Paddock et al. | 29/281.5 |
| 5,611,146 | 3/1997 | Ducret | 269/239 |

*Primary Examiner*—Robert C. Watson
*Attorney, Agent, or Firm*—Bacon & Thomas

[57] ABSTRACT

A carrier is disclosed for carrying and holding a spindle of a machine during removal and installation of the spindle and while performing maintenance on the spindle. The carrier has a spindle support, a carrying handle, and a device for engaging a portion of the machine so as to removably support the carrier on the machine. The carrier has opposite end plates, each end plate having a recess configured to receive a portion of the spindle such that the spindle may be supported on the end plates in the recesses. In use, the carrier is removably supported on a portion of the machine by attachment members which may be movably mounted on the end plates and attached to the carrier handle. By extending the attachment members, the carrier is supported on the machine and positioned so that the spindle is located in the recesses in the end plate. This enables a single person to then remove the shaft supporting the spindle on the machine while the carrier holds the spindle in position.

18 Claims, 9 Drawing Sheets

SPINDLE CARRIER AND HOLDER

BACKGROUND OF THE INVENTION

The present invention relates to a carrier for carrying and holding a spindle of a machine while removing the spindle from the machine, storing and/or conducting maintenance on the spindle, and reinstalling the spindle on the machine.

Cutting machines are well-known in the art for slicing or dicing various products, such as food products. Typically, these machines have one or more rotating spindles on which are located a plurality of knives, either longitudinal-cut or cross-cut knives. During normal maintenance of these machines, it may be necessary to remove the spindle from the machine and to either store the spindle while maintenance is carried out on the machine, or hold the spindle while maintenance is performed on the cutting blades.

In the past, the removal of the cutting spindle and its reinstallation, had required, at minimum, two personnel. One person is necessary to hold the spindle while the other person removes the shaft rotatably attaching the spindle to the machine. Indeed, given the increasing sizes of such machines, it may be necessary for more than two persons to hold the spindle and to physically remove it from the machine once the shaft has been withdrawn.

It is also necessary to store the spindles such that no damage occurs to the cutting knives. If maintenance is to be performed on the spindle itself, such as by replacing one or more of the blades, it also becomes necessary for the spindle to be held on a support surface while the blades are replaced and/or their positions readjusted.

All of these requirements have heretofore necessitated a heavy expenditure of time and manpower to carry out such routine maintenance operations.

SUMMARY OF THE INVENTION

A carrier is disclosed for carrying and holding a spindle of a machine during removal and installation of the spindle and while performing maintenance on the spindle. The carrier has a spindle support, a carrying handle, and a device for engaging a portion of the machine so as to removably support the carrier on the machine. The carrier has opposite end plates, each end plate having a recess configured to receive a portion of the spindle such that the spindle may be supported on the end plates in the recesses.

In use, the carrier is removably supported on a portion of the machine by attachment members. The attachment members may be fixedly or movably mounted on the end plates and may also be attached to the carrier handle. The carrier is supported on the machine and positioned so that the recesses in the end plates are aligned with the spindle shaft bearing. This enables a single person to then remove the shaft supporting the spindle on the machine while the carrier holds the spindle in position. An adjustment bracket on the carrier extends past the recesses such that the position of the recesses relative to the spindle shaft bearings may be adjusted. Once the spindle shaft has been removed, the operator may then remove the carrier and the spindle from the machine by grasping the carrying handle. If the carrier has movable attachment members, they are moved to their retracted positions before the carrier is removed from the machine.

The carrier has a carrier surface configured to contact a support surface such that the carrier, along with the spindle, may be placed on the support surface without any contact between the knives and the support surface which would damage the cutting knives. A stop member extends from the carrier surface and may engage an edge of the support surface to prevent relative sliding movement between the carrier and the support surface while the knives are replaced and/or adjusted. Again, this enables a single person to perform such maintenance.

To reinstall the spindle on the machine, the carrier, with the spindle, is again removably supported on the machine to properly align the spindle opening with the spindle shaft bearings on the machine. Once aligned, the spindle is supported solely by the carrier while the spindle shaft is reinserted through the spindle shaft bearings and the spindle. Following the shaft insertion, the carrier may be readily removed from the machine.

DETAILED DESCRIPTION OF THE PREFERRED EMBODIMENT

Figure 1:
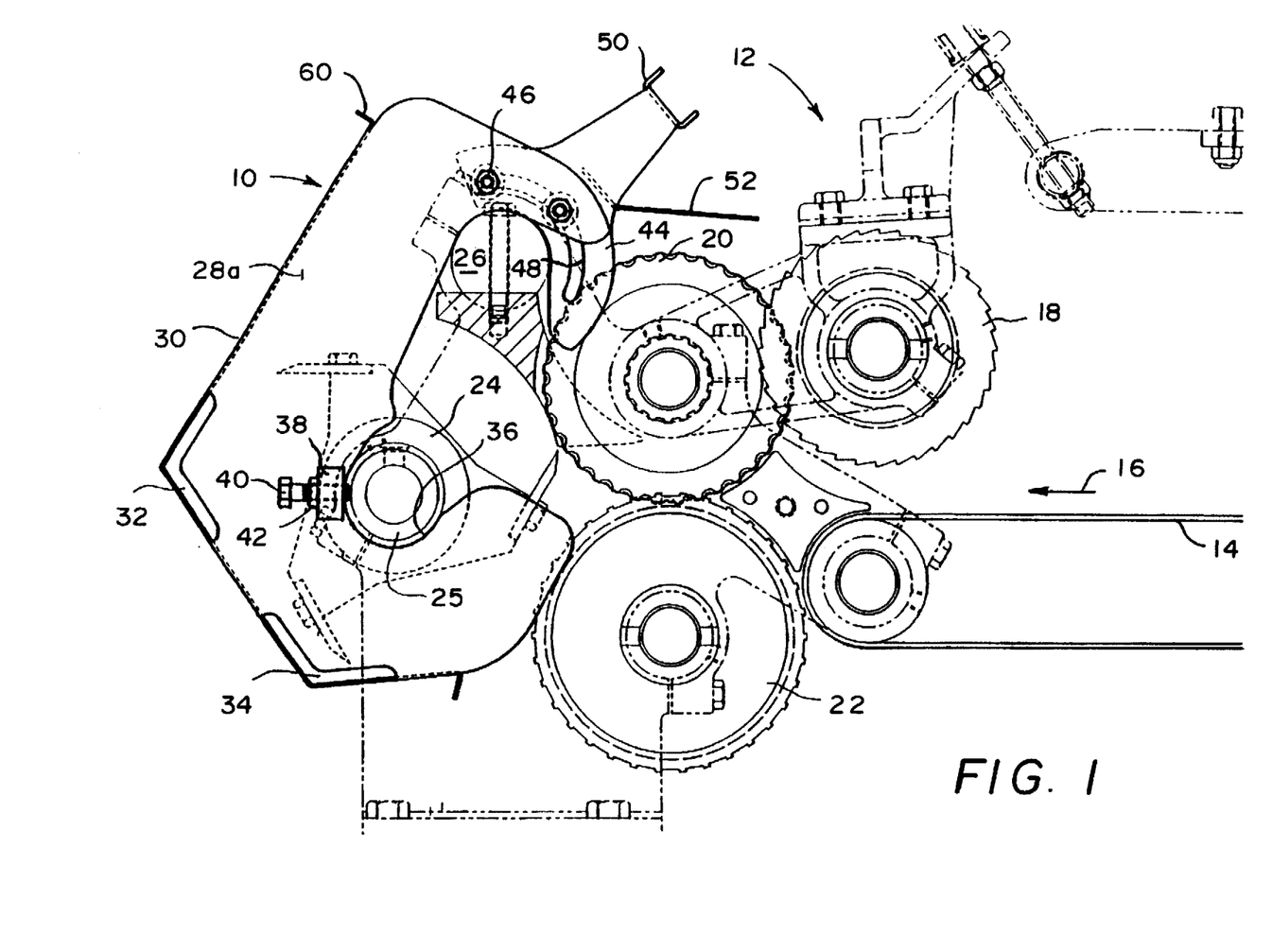
FIG. 1 is a side view of a first embodiment the carrier according to the present invention located on a cutting machine.

FIG. 1 illustrates a carrier 10 removably supported on a dicing machine, generally indicated at 12. Although the operation of the carrier 10 will be described in conjunction with a dicing machine set forth in U.S. Pat. No. 5,129,299, it is to be understood that the principles elucidated herein are not limited to the use with such a machine and the carrier may be utilized with any machine having a spindle.

Dicing machine 12 has a feed conveyor 14 for feeding a product (not shown) to be diced in the direction of arrow 16. The product passes under feed roll 18 and between a longitudinal knife spindle 20 and feed drum 22. Longitudinal knife spindle 20 is rotatably supported on the machine frame (not shown) and comprises a plurality of generally circular cutting knives disposed in parallel along the length of the spindle. These knives cut the product into elongated strips which are then further cut into chunks by cross-cut knife spindle 24. Knife spindle 24 is rotatably supported on the machine frame by spindle shaft 54 passing through a center opening in the spindle 24 and through spindle shaft bearings 25 affixed to the machine frame, and is rotated by the machine drive mechanism (not shown). The dicing machine also has a crossbar 26 extending between the sides of the machine framework.

Carrier 10 comprises opposite end plates 28a and 28b interconnected by a panel having a carrier surface 30 and openings 32 and 34. Each of the end plates 28a and 28b has a recess 36 configured to receive a portion of the spindle 24 therein. A bracket 38 may extend laterally from one or both of the end plates 28a and 28b and is engaged by a threaded adjusting member 40. Rotating the adjusting member 40 relative to the bracket 38 will adjust the position of an opposite end of the adjusting member 40 which bears against spindle shaft bearing 25 so as to precisely adjust the positions of the recesses 36 relative to the spindle shaft bearing 25. A lock nut 42 may be installed on the adjusting member 40 so as to lock it in position once the adjustment has been achieved.

An attachment member 44 is attached to one or both of the end plates 28a and 28b by fasteners 46 extending through the end plate and through an elongated slot 48 formed in the attachment member 44.

Handle 50 is connected to, or formed integrally with attachment member 44 and extends laterally across the carrier between the end plates 28a and 28b. A member 52 extends from the handle 50 to prevent any incidental contact with other machine parts during use of the carrier. The handle 50 also serves as an actuator for moving the attachment members 44 between extended positions, illustrated in FIG. 1, and retracted positions, illustrated in FIGS. 3 and 4.

In operation, the carrier 10 is placed on the machine 12 such that the recesses 36 accommodate a portion of the spindle 24 therein. The upper portion of the carrier is oriented such that it contacts the cross member 26 and the handle 50 is moved so as to move the attachment members 44 to their extended positions as illustrated in FIG. 1. This supports the carrier 10 on the machine 12 with the spindle 24 positioned in the recesses 36.

Figure 2:
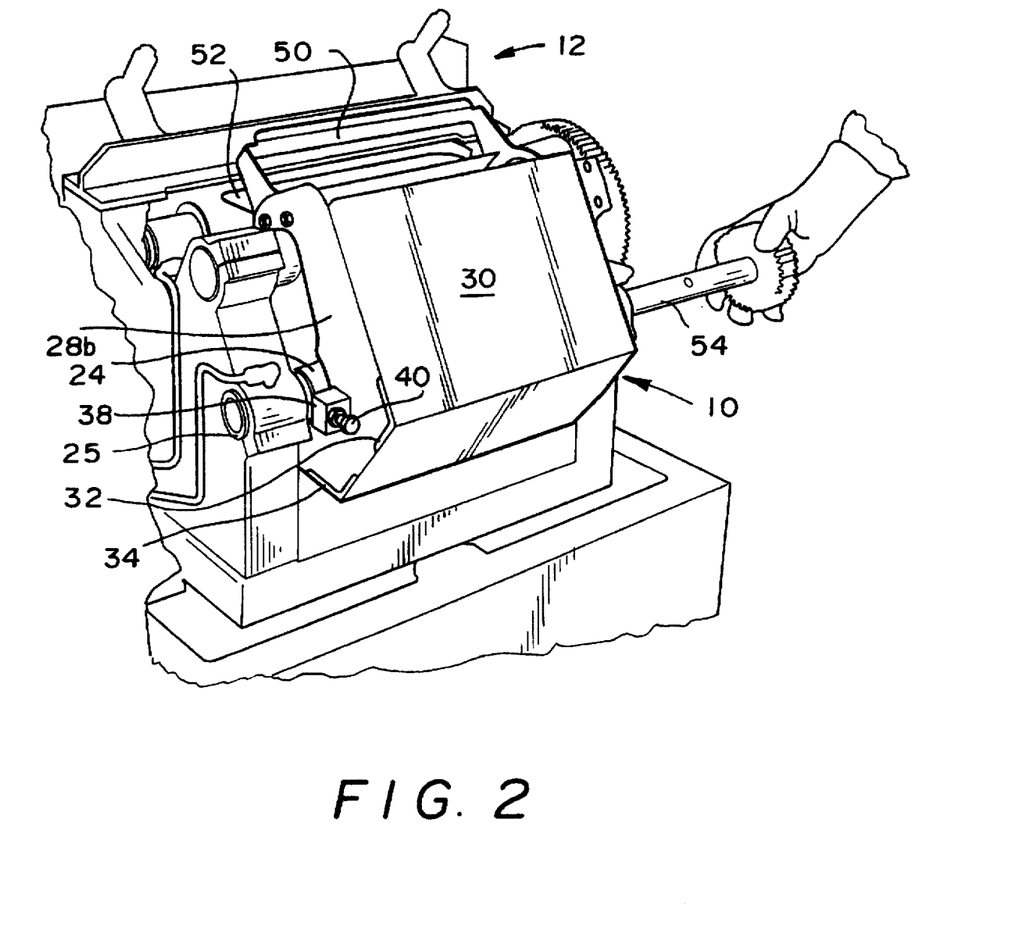
FIG. 2 is a perspective view of the carrier in FIG. 1 on a cutting machine illustrating removal or insertion of the spindle shaft.

At this point, as illustrated in FIG. 2, the spindle shaft 54 rotatably supporting the spindle 24 on the machine 12 may be removed leaving the spindle 24 solely supported by the carrier 10.

Figure 3:
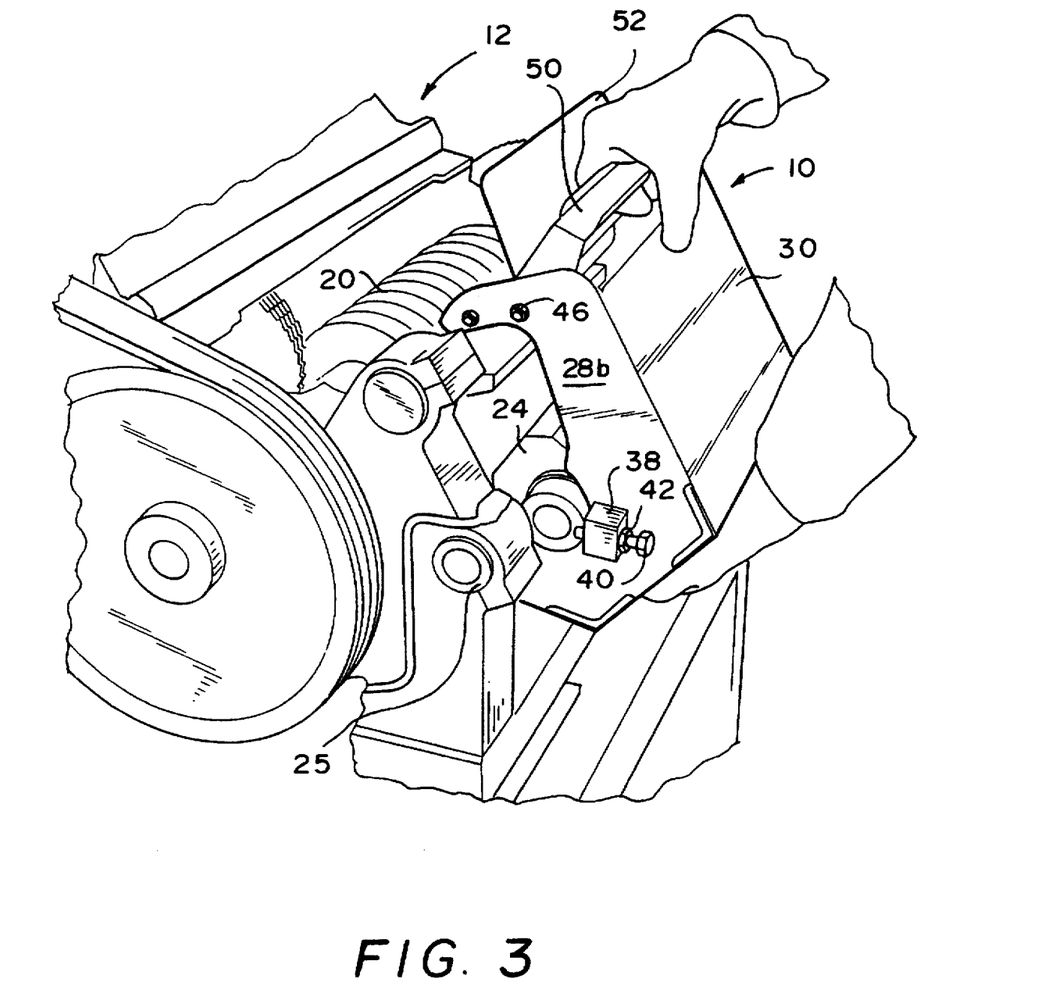
FIG. 3 is a perspective view, similar to FIG. 2, illustrating the removal or insertion of the carrier with the cutting spindle.

To remove the spindle 24 from the machine 12, the handle 50 is moved so as to move the attachment members 44 to their retracted positions, as illustrated in FIG. 3 after the operator has grasped the lower portion of the carrier 10. The carrier 10 along with the spindle 24 may then be physically removed from the machine 12 to facilitate maintenance of the machine 12 and/or the spindle 24.

Figure 4:
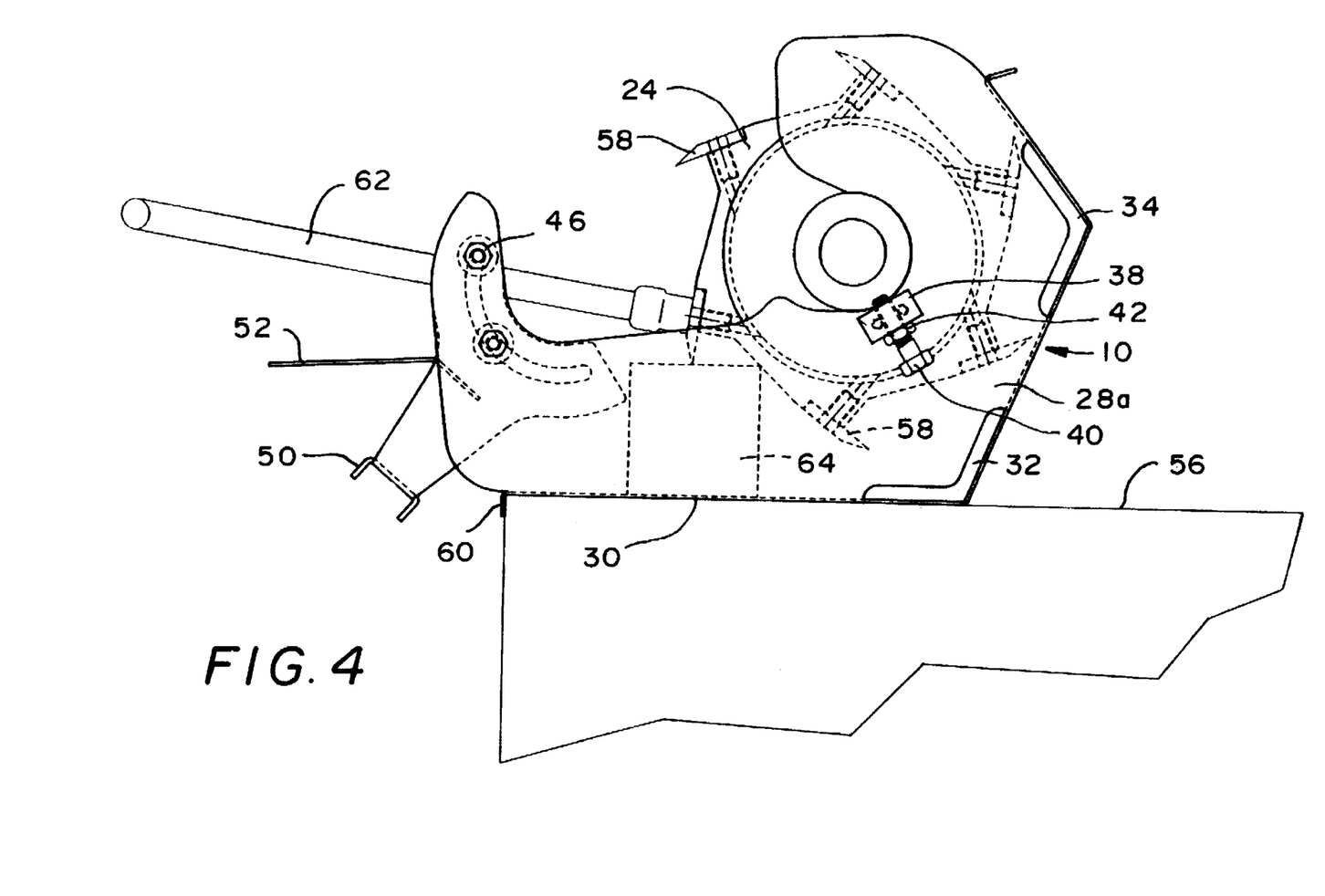
FIG. 4 is a side view of the carrier shown in FIG. 1 supporting a cutting spindle on a support surface.

The carrier 10 may be utilized as a device to store the spindle 24 on a support surface 56, as illustrated in FIG. 4. Support surface 56 may be formed as part of a table, workbench, or the like, with the carrier 10 resting thereon on the carrier surface 30 such that the cutting blades 58 of the spindle 24 are out of contact with the surface 56 thereby preventing damage to the cutting blades.

Figure 5:
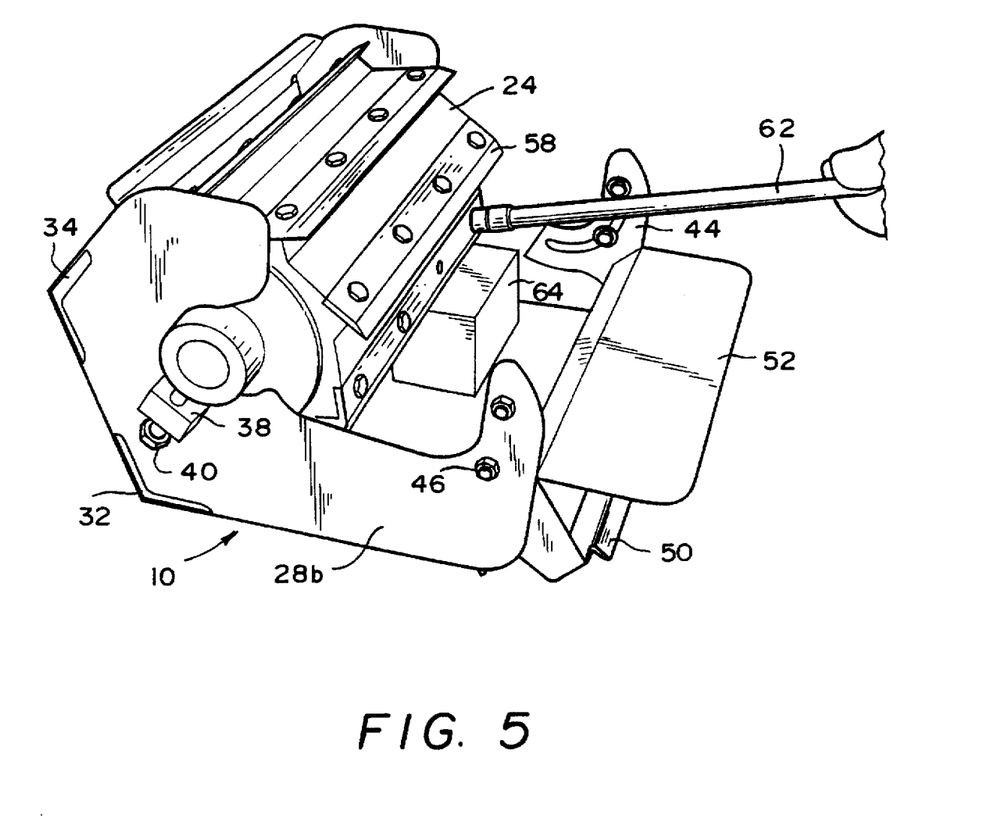
FIG. 5 is a perspective view, similar to FIG. 4, illustrating maintenance on the cutting spindle while supported in the carrier.

If maintenance is to be performed on the spindle 24 by either replacing or adjusting the positions of cutting blades 58, the carrier 10 is positioned on the support surface 56 such that stop member 60, extending from surface 30, engages an edge of the surface 56. Such engagement prevents relative sliding movement between the carrier 10 and the surface 56 thereby enabling sufficient loosening or tightening forces to be exerted on bolts holding the blades 58 on the spindle 24 by wrench 62. Such engagement also permits the maintenance work to be performed by one person by eliminating the need for another person to hold the spindle 24 in a steady position during such maintenance procedures. A block of wood 64, or other relatively soft material is placed under a blade 58 and the panel having surface 30 so as to prevent rotation of the spindle 24 in the carrier 10 while the maintenance is performed. This material should be chosen so as to impart no damage to blades 58.

After the maintenance has been performed on the spindle 24 and on the machine 12, the spindle 24 may be replaced by reversing the above steps. The carrier 10 with the spindle 24 is placed on the machine 12 to align the opening in the spindle 24 with the opening in the spindle shaft bearings 25 and the handle is moved so as to extend the attachment members 44, thereby supporting the carrier 10 and the spindle 24 on the machine 12. The spindle shaft 54 is then reinserted through the spindle shaft bearings 25 and the spindle 24, and reattached to the machine 12. Since the spindle 24 is now fully supported on the machine 12, the carrier 10 may be removed by moving the handle so as to retract the attachment members 44.

Figure 6:
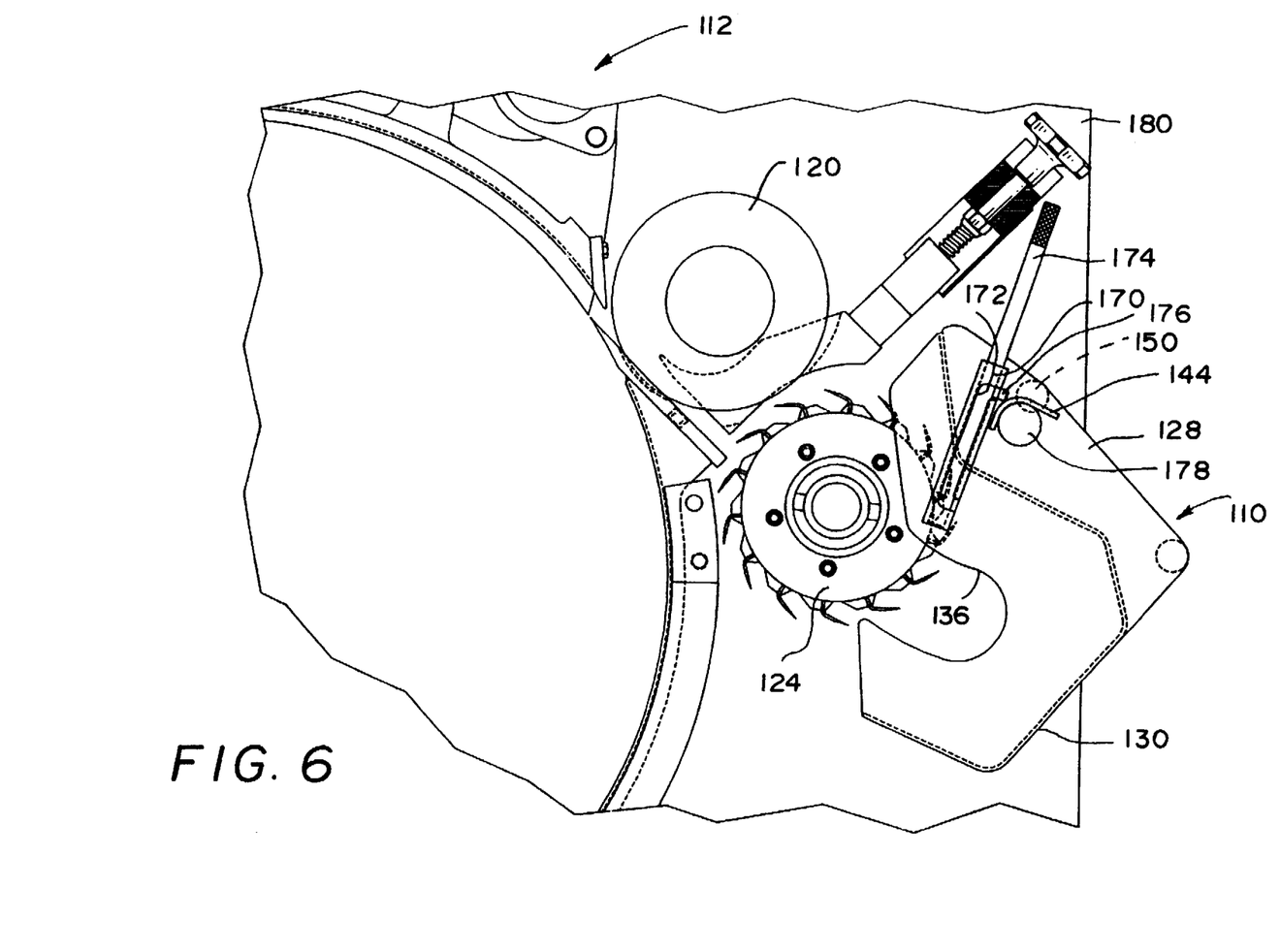
FIG. 6 is a side view of a second embodiment of the carrier according to the present invention.
Figure 7:
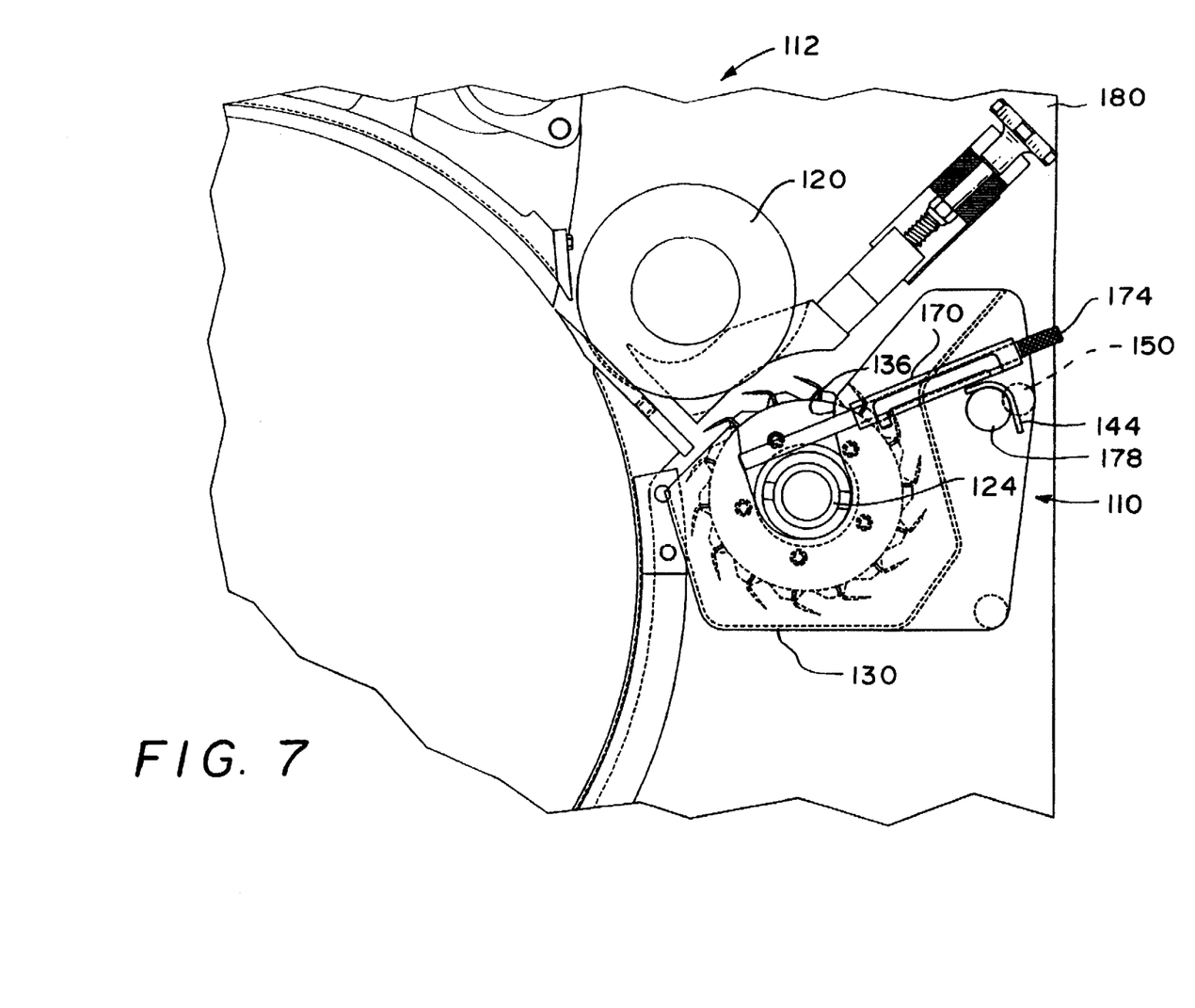
FIG. 7 is a side view of the carrier of FIG. 6 attached to the spindle.

An alternative embodiment of the carrier and holder according to the present invention is illustrated in FIGS. 6 and 7. Carrier 110 is utilized on a cutting apparatus 112 similar to that previously described and having a longitudinal cutting spindle 120 which slices the product into elongated strips and cross cut knife spindle 124 which cuts the elongated strips into chunks. These spindles are rotated by the drive mechanism (not shown) associated with cutting machine 112.

Carrier 110 comprises opposite end plates 128 interconnected by a panel having a carrier surface 130 and a handle 150. Each end plate 128 defines recess 136 sized to accommodate a portion of the cross cut spindle 124 therein. Attachment members 144 extend laterally outwardly from each end plate 128 and may have a generally arcuate configuration, as illustrated in FIGS. 6 and 7.

A locking mechanism is also associated with one or both end plates 128 of the carrier 110 so as to lock the spindle 124 in the recesses 136. The locking mechanism comprises a hollow sleeve 170 having a slot 172 extending through one side wall of the generally tubular sleeve. Slot 172 is generally "U"-shaped in configuration having opposite end portions circumferentially displaced from the base of the "U". Elongated locking member 174 is slidably received within the sleeve 170, the locking member 174 having a latching member 176 extending laterally therefrom so as to extend through the slot 172. As illustrated in FIG. 6, the locking member 174 is withdrawn to an unlocked position wherein the latching member 176 engages one of the end portions of the slot 172. In this position, the locking member 174 does not extend into or across the recess 136.

The carrier 110 is placed on the machine 112 with the attachment members 144 supported on bosses 178 which extend laterally inwardly from opposite side plates 180 of the machine 112 such that the carrier 110 is supported in the position illustrated in FIG. 6.

The carrier 110 is then pivoted about the bosses 178 (clockwise as illustrated in FIGS. 6 and 7) such that a portion of the spindle 124 is located within the recesses 136. The locking member 174 is then rotated about its longitudinal axis to enable the latching member 176 to slide along the groove 172 until it reaches the opposite end portion of the groove. At this point, the locking member 174 is rotated in an opposite direction about its longitudinal axis such that the latching member 176 engages the opposite end portion of the "U"-shaped slot 172. As illustrated in FIG. 7, the end of the locking member 174 extends across the opening of the recess 136 so as to physically lock the spindle 124 into the recess. Engagement of latching member 176 with the end portion of slot 172 prevents movement of locking member 174 along its longitudinal axis.

At this point, the spindle shaft (not shown) rotatably supporting the spindle 124 on the machine 112 may be withdrawn. Once the spindle shaft has been completely removed, the carrier 110, holding the spindle 124, may be removed from the machine 112. The carrier 110 may be placed on a support surface by resting on its carrier surface 130 so as to prevent any damaging contact between the support surface and the blades on the spindle 124.

Installation of the spindle 124 in the machine 112 is carried out by the reverse of the aforementioned steps. The carrier 110, with the spindle 124, is again placed on the bosses 178 so as to be supported by the attachment members 144. The carrier is pivoted in a clockwise direction, as illustrated in FIGS. 6 and 7, until the opening in the spindle 124 is aligned with the openings in the spindle shaft bearings (not shown) and the spindle shaft is reinserted. Once the spindle 124 is physically supported on the machine 112, the locking members 174 are withdrawn to their retracted positions, thereby enabling the carrier 110 to be removed from the machine 112.

Figure 8:
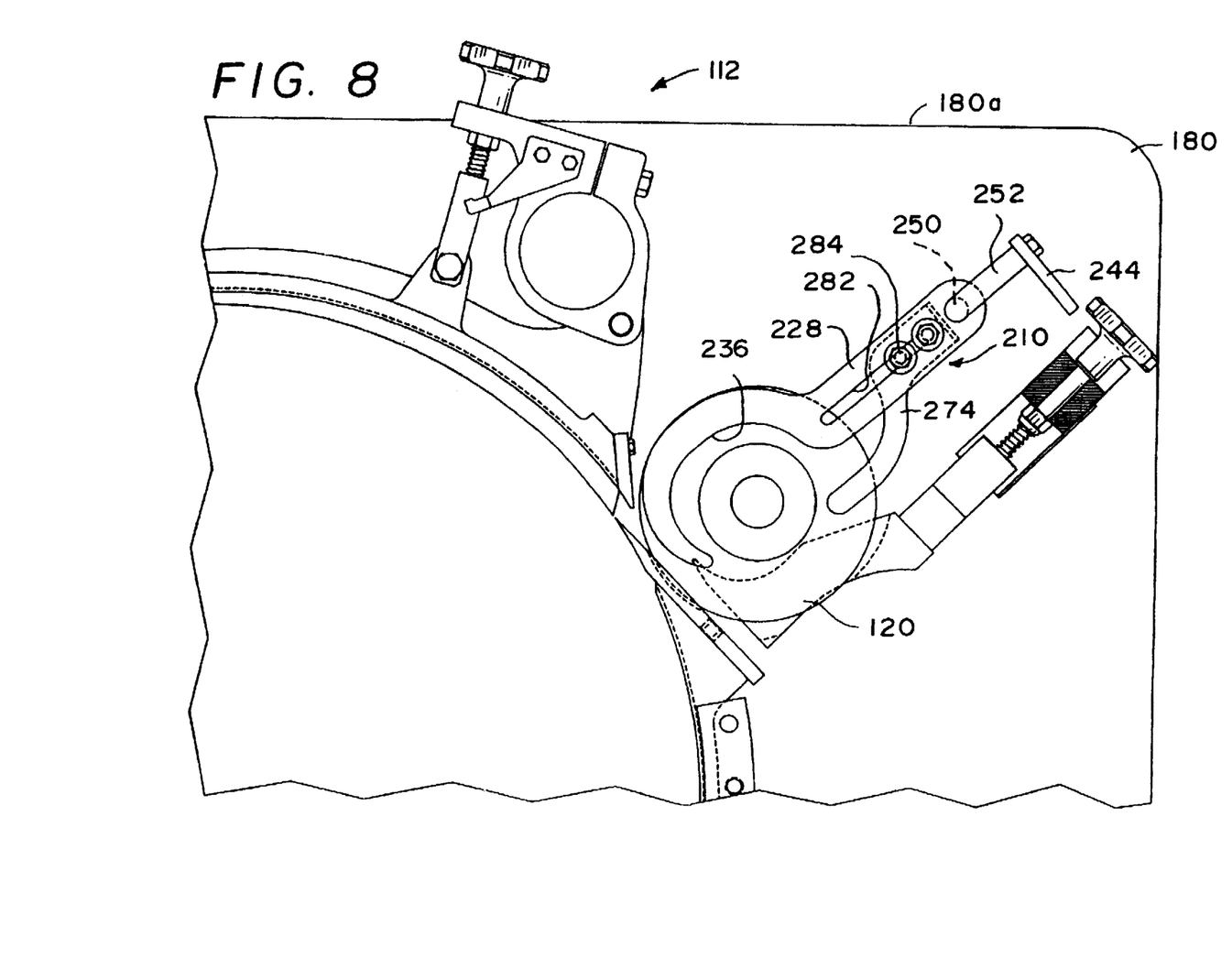
FIG. 8 is a side view of a third embodiment of the carrier according to the present invention.
Figure 9:
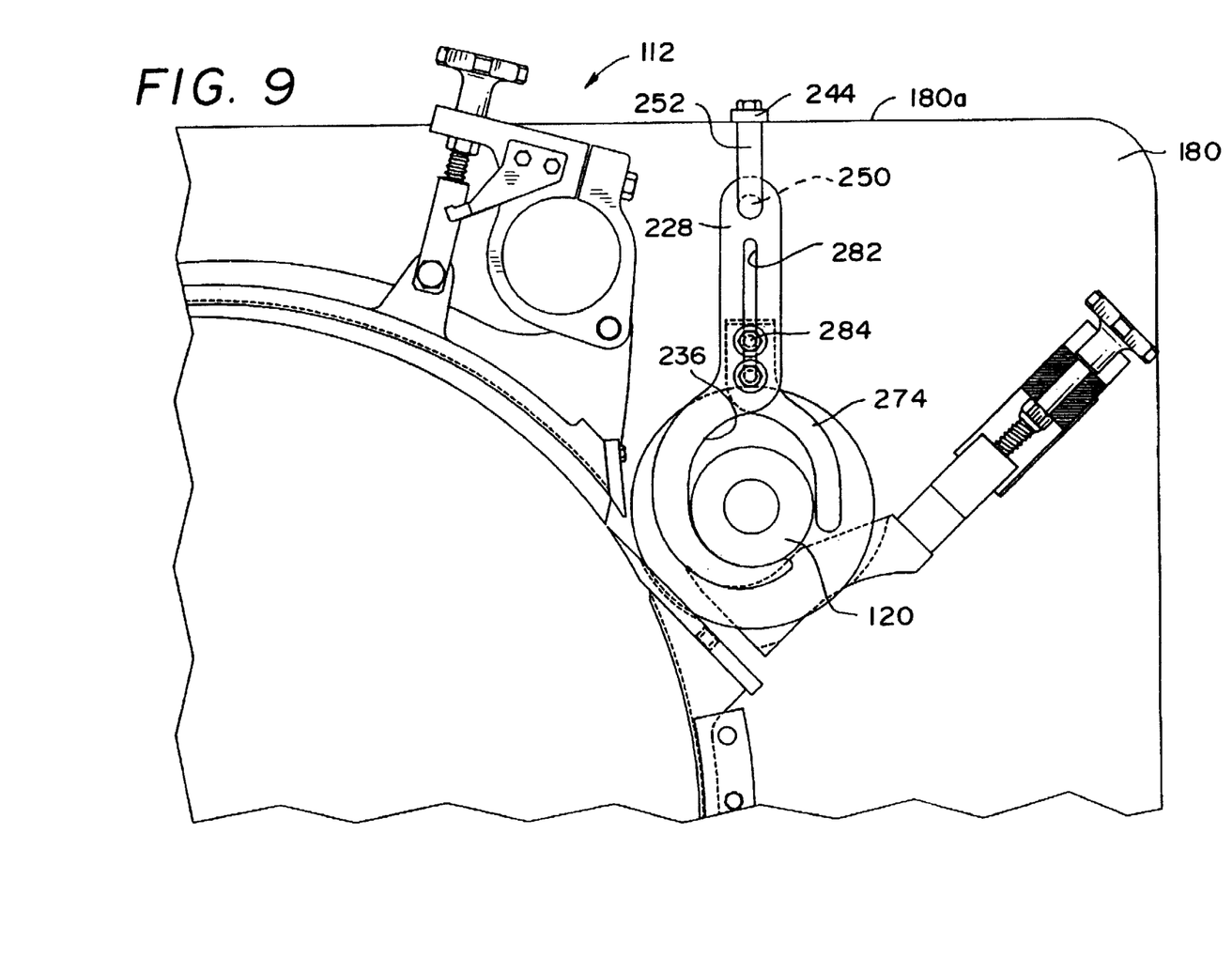
FIG. 9 is a side view of the carrier of FIG. 8 attached to the spindle and to the machine.

A third embodiment of the carrier according to the present invention may be utilized to remove and install the longitudinal knife spindle 120 from the machine as illustrated in FIGS. 8 and 9. In this embodiment, the end plates 228 have a generally hook-shaped configuration forming a recess 236. The end plates 228 are interconnected by carrying handle 250 which extends through the end plates and terminates in opposite end portions 252. An attachment member 244 is pivotally attached to each of the end portions 252. At least one of the end plates 228 has an elongated slot 282 through which extend fasteners 284 attached to locking member 274. Locking member 274 is movable with respect to the end plates between a retracted position, illustrated in FIG. 8 in which the recesses 236 are open, and an extended position, illustrated in FIG. 9, wherein the locking member 274 covers a major portion of the openings of recesses 236 to retain the spindle 120 in the recess.

In use, the carrier 210 is inserted between the opposite side plates 180 of the machine 112 such that a portion of the spindle 120 is located in the recesses 236, as illustrated in FIG. 8. The carrier 210 is then pivoted in a generally counter clockwise direction, as illustrated in FIGS. 8 and 9, so that the attachment members 244 are aligned with the top edge portions 180a of the side plates 180. The attachment members 244 are then pivoted approximately 90° such that they engage the upper surface 180a of the side plates 180 to hold the carrier in position on the machine 112. The locking members 274 are moved to their extended positions so as to lock the spindle 124 in the recesses 236. The locking member 274 may be moved to the locking position prior to the engagement of the attachment members 244 with the surface 180a, if necessary.

At this point, the spindle 120 is supported by the carrier 210 and its associated spindle shaft (not shown) may be removed from the spindle 120 and the machine 112, leaving the spindle 120 supported solely by the carrier 210. Following removal of the spindle shaft, the operator may grasp the handle 250 and physically remove the carrier 210 and the spindle 120 from the machine.

Installation of the spindle 120 is carried out by the reverse of the aforementioned steps. The carrier 210 and spindle 120 are supported on the machine 112 by the attachment members 244 until the spindle shaft is reinserted through the spindle shaft bearings (not shown) and the spindle 120. The attachment members 244 then pivoted approximately 90° and the locking member 274 is moved to its retracted position to enable the carrier 210 to be removed from the spindle 120.

The foregoing description is provided for illustrative purposes only and should not be construed as in any way limiting this invention, the scope of which is defined solely by the appended claims.

We claim:

1. A carrier for carrying and holding a spindle of a machine, the carrier comprising:
   a) a pair of laterally spaced apart end plates, each end plate having a recess configured to receive a portion of the spindle therein;
   b) a carrying handle connected to and extending between the laterally spaced apart end plates; and,
   c) at least one attachment member connected to at least one of the carrying handle and the pair of laterally spaced apart end plates to removably support the carrier and the spindle on the machine.

2. The carrier of claim 1 further comprising an adjustment mechanism attached to at least one end plate to adjust the position of the recess relative to a spindle shaft bearing on the machine.

3. The carrier of claim 2, wherein the adjustment mechanism comprises:
   a) a bracket extending from the at least one end plate; and,
   b) an adjusting member threadingly engaged with the bracket.

4. The carrier of claim 1 wherein the at least one attachment member is movably mounted on the carrier so as to move between extended and retracted positions.

5. The carrier of claim 4 wherein the at least one attachment member is attached to the carrying handle.

6. The carrier of claim 1 comprising means to movably attach the at least one attachment member to at least one of the pair of end plates.

7. The carrier of claim 6 wherein the means to movably attach the at least one attachment member comprises:
   a) an elongated slot in one of the at least one attachment member and at least one end plate; and,
   b) a fastener connected to the other of the at least one attachment member and at least one end plate, and extending into the elongated slot.

8. The carrier of claim 7 wherein the elongated slot extends along an arc.

9. The carrier of claim 7 wherein the elongated slot is in the at least one attachment member.

10. The carrier of claim 1 further comprising a carrier surface on the carrier configured to rest on a support.

11. The carrier of claim 10 further comprising anti-sliding means on the carrier surface so as to prevent relative sliding movement in at least one direction between the carrier surface and the support.

12. The carrier of claim 11 wherein the anti-sliding means comprises a stop member extending from the carrier surface.

13. The carrier of claim 1 further comprising a movable locking device to selectively extend substantially across at least one of the recesses.

14. The carrier of claim 13 wherein the movable locking device comprises:
   a) a hollow sleeve on at least one of the pair of end plates; and,
   b) a locking member slidably received in the hollow sleeve and movable between a retracted position wherein the locking member does not extend into the recess and an extended position wherein the locking member extends substantially across the recess.

15. The carrier of claim 14 further comprising:
   a) a slot formed along the hollow sleeve; and, b) a latching member extending from the locking member in engagement with the slot.

16. The carrier of claim 15 wherein the slot has a generally "U" shaped configuration.

17. The carrier of claim 15 wherein the movable locking device comprises:

a) a locking member; and, b) means to movably attach the locking member to at least one of the pair of end plates such that the locking member is movable between a retracted position wherein the locking member does not extend substantially across the recess and an extended position wherein the locking member extends substantially across the recess.

18. The carrier of claim 17 wherein the means to movably attach the locking member to the end plate comprises:

a) an elongated slot formed in the end plate; and, b) fastening means extending from the locking member into the elongated slot.

* * * * *